3,692,693
DESULFATION OF REFORMING CATALYSTS
Harry E. Gunning, Edmonton, Alberta, and Bruce G. Jameson and Jackson Eng, Sarnia, Ontario, Canada, assignors to Esso Research and Engineering Co.
No Drawing. Filed Oct. 15, 1970, Ser. No. 81,153
Int. Cl. B01j 11/74, 11/18, 11/30
U.S. Cl. 252—415                                    12 Claims

ABSTRACT OF THE DISCLOSURE

A process for the regeneration of sulfur deactivated catalysts by contact, or reaction, of the said catalyst with methane. A catalyst, or catalyst composite, which has been poisoned, and thereby deactivated, by contact with sulfur in sufficient concentration and exposed to oxygen to form the sulfate, can be regenerated by contact with methane. Such catalyst regeneration technique finds particular utility in semiregenerative type reforming processes. Reforming catalysts, particularly catalyst composites which contain alumina, e.g. noble metal on an alumina base such as platinum-on-alumina, which has been deactivated by sulfur compounds can be regenerated by contact with methane at temperatures ranging generally from about 700° F. to about 1050° F., and at pressures ranging from about 15 p.s.i. to about 300 p.s.i.

---

It is known, all too well, that sulfur can enter reaction systems, e.g. reforming (hydroforming) reactors, either as sulfur compounds contained in the feed, or as sulfur dioxide from an inert gas generator which is being operated on sour fuel. It is also well known that the presence of sulfur often produces adverse effects on catalyst activity, selectivity and operating cycle life.

Reforming is a catalytic process for conversion of low octane naphthas into higher octane gasolines. Straight-run or virgin naphtha, mixed with hydrogen or hydrogen-rich recycle gas, is subjected at elevated temperatures and pressures to the influence of catalytic materials in one or a series of fixed bed reactors. Sulfur compounds in the feed are largely converted to hydrogen sulfide by the reforming catalyst, part of the hydrogen sulfide leaving the last reactor appearing in the recycle gas so that the total amount of hydrogen sulfide entering the reactor can be several times as great as the amount entering with the fresh feed.

Sulfur is undesirable in reforming feeds for several reasons. Among these reasons is that sulfur is converted at reforming conditions to hydrogen sulfide which reduces the aromatization activity of the catalyst and hence causes poor selectivity. This effect, however, becomes acute when the sulfur content of the feed exceeds about 100 p.p.m. Even lower sulfur concentrations can prove troublesome, for other reasons. Sulfur thus forms scale which is deposited in the catalyst bed or on the walls of the processing equipment, e.g., on furnace piping. In addition, sulfur can accumulate on the reforming catalyst. It can be either chemically or physically combined with the catalyst, or can appear as iron scale admixed with the catalyst. Thus, the catalyst becomes sulfided and, upon exposure to oxygen in a subsequent regeneration, becomes sulfated and poisoned.

In commercial operations, it is highly desirable that the sulfur concentration in the feed not exceed about 10 parts, and preferably should not exceed about 5 parts, per million parts of feed (p.p.m.). At these concentrations, sulfate poisoning can usually be avoided provided that sufficient hydrogen is added or recycled to strip out the sulfur, as hydrogen sulfide, from the reaction mixture. By maintaining low sulfur in the feed and a sufficiently high recycle gas rate therefore, sulfur accumulation and consequent catalyst poisoning can be avoided.

For these reasons, sulfur-containing naphtha feedstocks are generally hydrofined without substantial hydrocarbon conversion in the presence of a sulfur (and nitrogen) tolerant catalysts, e.g., a Group VI-B or VIII metal catalyst such as cobalt molybdenum on an alumina-silica base, with a view to eliminating sulfur. Complete elimination of sulfur, however, is not practical and eventually sufficient sulfur finds its way into the reforming process to cause catalyst poisoning. Such problems are particularly recurrent in the operation of conventional semiregenerative (semi-regen) reforming units.

The reforming operation must be shut down for regeneration of the catalyst when the latter has been poisoned and deactivated. In conventional practice, in the semi-regen type unit, purchased cylinder hydrogen is used to regenerate the sulfur-poisoned catalyst. Unfortunately, however, purchased hydrogen is costly and is not always available for such usage. Sulfur-free hydrocarbons, which can be dehydrogenated, can also be used to produce hydrogen in situ to regenerate the poisoned catalyst but, as in the case of cylinder hydrogen, they are not always readily available. Alternate materials for regenerating such catalysts are thus highly desirable.

It has now been discovered that methane can be used to regenerate or desulfurize sulfur poisoned, or sulfated catalysts. This discovery is surprising for it is known that methane, unlike higher molecular weight hydrocarbons, is not a hydrogenating agent at catalyst regeneration conditions, and thus there is no possibility that the reaction mechanism can proceed through in situ generation of hydrogen so as to produce reactivation of catalysts via a hydrogen mechanism.

The present discovery is based on a consideration of the nature of catalysts and the in situ corrosion of ferrous metal processing equipment and the subsequent accumulation of iron scale which is gnown to occur in catalyst beds. The generally accepted mechanism for scale formation in the subsequent sulfation of catalysts is thus as folows:

(1) During reforming, iron scale is formed and accumulates in accordance with the equation $$Fe + H_2S \rightarrow H_2 + FeS$$

(2) During regeneration, scale is oxidized in accordance with the equation $$FeS + O_2 \rightarrow Fe_2O_3 + SO_2 \text{ or } SO_3$$

The $SO_2$ or $SO_3$ is adsorbed on the catalyst, e.g., the base of a platinum-on-alumina reforming catalyst and becomes oxidized to form the sulfate, i.e., $SO_4^=$, resulting in a poisoned catalyst. The catalyst, in accordance with this invention, can be reactivated by contact, or reaction, of the said catalyst with methane. The exact nature of the reaction is unknown, but it is certain that the reactivation does not proceed through the normal hydrogen reduction mechanism and there is no hydrogen sulfide generated as would occur during hydrogen treatment of such catalysts, as known in the prior art.

Whatever the mechanism, methane can be reacted with various types of sulfated catalysts to effect their reactivation. Sulfated catalysts constituted in whole or part of sulfated metals of Groups I-B, II-B, III-A, and VIII metals of the Periodic Chart of the Elements (Fisher Scientific Company, copyright 1952) can be regenerated or desulfated pursuant to the practice of this invention. Catalyst constituted in whole or in part of sulfated alumina, iron and zinc have been found particularly susceptible to reactivation by contact, or reaction with methane whether the said metal constitutes a part of the base or is distended, impregnated, exchanged or otherwise incorporated within the catalyst composite, or both. It is particularly fortunate that aluminum sulfate is very highly susceptible to methane treatment at regenerative reforming conditions for reactivation of the catalyst for the problems of sulfur poisoning in semi-regen reforming units can be particularly severe, and hence the use of methane for regeneration of catalysts in such units is a particularly preferred mode of practicing the present invention.

A dual function catalyst mechanism has been generally accepted for reforming catalysts, and such catalysts are thus composites which include an acidic base for promoting isomerization reaction and a metal component for promoting dehydrogenation and cyclization reactions. Such bases typically contain a major portion of an inorganic oxide such as aluminum oxide, e.g., alumina, and metal components, either as elemental metal or as oxides and sulfides of such metals, e.g., Group VIII noble metals, especially platinum group metals, and mixtures of these and other metals. Platinum-on-alumina, e.g., is widely used commercial catalyst, and is especially susceptible to methane treatment for reactivation pursuant to the practice of this invention. In the course of reforming, catalysts thus commonly become deactivated from coke deposition and halogen loss, as well as being poisoned by sulfur, and catalytic activity is restored by regenerating in situ. While various regeneration techniques are described in the patent art, these typically involve oxidation and removal of the carbon from the catalyst at elevated temperatures, followed by hydrogen treatment of the carbon-depleted catalyst. Such regeneration procedures are described, e.g., in U.S. 2,664,404 and U.S. 2,641,582. A preferred type of regeneration procedure is described in U.S. 3,134,732, the latter being incorporated herein by way of reference.

In a semi-regen reforming unit there is included a reaction side and a catalyst regeneration side. The reaction side comprises lead, intermediate, and tail reactors, heating zones prior to each of these reactors, a gas separation zone after the reactors, and compressor and lines for recycling separated gas. The regeneration side comprises a flue gas source, a scrubbing or contacting zone, such as a water spray tower, and a drier whereby water is removed from regeneration gases. It also includes a circulator and lines whereby flue gas can be circulated through the scrubbing zone, drier and valved lines for connecting the regeneration side to the reaction side.

Typically, a platinum-on-alumina catalyst is charged to each of the series of reactors to provide fixed catalyst beds, and naphtha feed is passed sequentially through a reheat furnace and thence downwardly through a succeeding reactor of the series. A hydrogen-rich recycle gas stream is passed over the catalyst together with the naphtha feedstock to produce reforming, predominantly endothermic dehydrogenation and dehydrocyclization reactions. Recycle gas rate, temperature, pressure, and frequency of catalyst regeneration are major process variables. Reforming temperatures, which vary from one reactor to the next of the series, generally range from about 750° F. to about 1000° F., the latter being a cut-off temperature. It is thus necessary to gradually elevate temperature after initial startup due to catalyst fouling by accumulation of coke deposits thereon. Outlet temperatures range from about 800° F. to about 920° F., and average reactor temperatures from about 850° F. to about 950° F. Typical reactor conditions are as tabulated below:

Pressure, p.s.i.g. _____ 200–750 (preferably 250–450).
Reactor temperature ° F. (inlet) __ 875–980 (preferred).
Recycle gas rate, s.c.f./b. _____ 3,000–10,000.
Space velocity, w./w./hr. _____ 0.5–10 (preferably 1–3).

The naphtha feed entering the reactor system contains sulfur as an undesirable impurity. Where the sulfur exceeds about 5 p.p.m., or about 10 p.p.m., the catalyst will become all-too-readily sulfided, and subsequently sulfated in the regeneration side of the semi-regen reforming unit.

In a semi-regen process, the entire reactor system or unit is kept on stream until shut down for catalyst regeneration. To regenerate the catalyst, pursuant to the best mode of practicing the present invention, the deactivated catalyst is treated in the following sequence.

(1) The reactors are generally, and preferably, purged with flue gas to eliminate hydrocarbons. This is desirable from a safety standpoint to prevent undesirable combustion, and should be done at about 900° F. to minimize hydrocarbon absorption by the catalyst.

(2) The deactivated catalyst, preferably, is first heated and the carbon or coke deposits oxidized, in a burn, or near burn, and removed therefrom by contact with a mixture of flue gas and air, the oxygen content of the gas being gradually increased until the temperature ranges from about 800° F. to about 1050° F. from about 900° F. to about 980° F. After removal of coke, as manifested by oxygen breakthrough above the catalyst bed, the burn is discontinued.

(3) Methane or a methane-enriched stream, e.g., natural gas (which is a highly preferred source of methane), is introduced into the reactors and contacted with the coke- or carbon-depleted sulfated catalyst. The methane is introduced at a rate, relative to catalyst, of from about 0.1 to about 10, preferably from about 0.5 s.c.f./lb./hr. to about 3 s.c.f./lb./hr., and the temperature of the reaction is maintained at from about 700° F. to about 1050° F., and preferably from about 875° F. to about 1000° F. Pressure is generally maintained at from about 15 p.s.i.g. to about 300 p.s.i.g., and preferably from about 50 p.s.i.g. to about 150 p.s.i.g. during the methane desulfation.

(4) A burn, as described in Step (2), supra, is necessarily performed after methane desulfation to eliminate coke deposits, or where a first burn or oxidation step is provided as preferred in accordance with Step (2), to eliminate any additional coke or carbon which may have accumulated during methane desulfation.

(5) A halogen treat is initiated to restore halogen to the catalyst after all evidence indicates that the catalyst is free of carbon (no rising temperatures and no oxygen disappearance). A halogen, preferably chlorine or a compound which will generate chlorine in situ, is introduced with some oxygen, generally 6–20 wt. percent, into the reactor while the temperature is held between about 600° F. and about 1050° F., and preferably from about 850° F. to about 1000° F. The halogen treatment is continued for a period ranging from about 0.5 to about 24 hours, preferably 8 to about 12 hours, or for a time sufficient to build up the halogen content of the catalyst, preferably to about 0.8 to 1.0 wt. percent.

(6) An oxygen-containing stream, preferably air, or gas containing from about 6 to about 20 wt. percent oxygen, is passed into the reactor to rejuvenate the catalyst. During rejuvention the temperature is gradually raised and then maintained at from about 500° F. to about 1000° F., and preferably from about 850° F. to about 950° F. The rejuvenation step is continued for a period ranging from about 0.5 to about 6 hours, preferably from about 2 to about 4 hours.

(7) For reasons of safety, it is highly desirable to purge with inert gas to remove oxygen to less than 0.5%.

(8) Hydrogen, a hydrogen-containing stream or an inert or nonreactive gas (e.g., methane or higher molecular weight hydrocarbons), is introduced into the reactor to dry the catalyst. The drying step is generally conducted at temperatures ranging from about 800° F. to about 1000° F., and preferably from about 850° F. to about 950° F., for a period ranging from about 0.5 to about 6 hours, and preferably from about 2 to about 4 hours. The system is then repressured and feed returned to the unit to conduct reforming.

The invention will be more fully understood by reference to the following selected, non-limiting examples and comparative data which illustrate its more salient features. All parts are given in terms of weight except as otherwise specified.

The examples and demonstrations which follow clearly show that sulfur can be removed, without significant loss in activity, from a highly preferred type of poisoned catalyst—viz, poisoned platinum reforming catalyst. The effect of temperature, pressure, methane gas treat rate and total methane treat gas volume are shown by specific reference to Examples 1–9 which immediately follow. A mechanism, which does not produce hydrogen and thus convert the sulfur to hydrogen sulfide is postulated, it being known however that the sulfur is removed by formation of the following: carbonyl sulfide, sulfur dioxide and elemental sulfur. It is shown that the mechanism of sulfur removal is independent of the metal dehydrogenation component or the base per se. The effect of treating with other gases such as nitrogen, air, oxygen, and helium have been tested in the desulfation step, and described hereafter, sulfur removal being shown to be significantly poorer than that obtained with methane. In Example 10, the sulfate removal with methane is compared with sulfate removal using hydrogen.

EXAMPLES 1–5

In a first demonstration, a platinum-on-alumina catalyst (0.3 wt. percent Pt on alumina) containing 1.51 wt. percent sulfur (4.0 wt. percent sulfate), was treated with methane at 900° F. and 100 p.s.i.g. No hydrogen sulfide was produced even after the temperature was increased to 1000° F. Even at this high temperature hydrogen sulfide was not detected in the tail gas, yet surprisingly analysis of the catalyst after the run showed that about 95% of the sulfur had been removed. In view of this early demonstration, an additional series of runs was then made on four similar catalysts containing different amounts of sulfur. The catalyst bed temperature during the runs (with one noted exception) was 1000° F. and the catalyst was treated with methane at 3 s.c.f. of methane per pound of catalyst per hour for 4 hours. Operating pressure was 100 p.s.i.g. Under this operation regime, sulfur on the catalyst in all cases was reduced significantly, to approximately 0.1 wt. percent. These data thus clearly indicate that methane is quite effective for desulfation. The latter results are tabulated in Table I, below.

TABLE I.—DESULFATION OF REFORMER CATALYSTS WITH METHANE

Operating conditions: 1,000° F., 100 p.s.i.g., 3 s.c.f./lb./hr., 4 hours

| Catalyst | Sulfur on catalyst, wt. percent | |
|---|---|---|
| | Before | After |
| A | 1.51 | 0.10 |
| | | 0.13 |
| | | 0.14 |
| | | 0.12 |
| B | 1.21 | 0.10 |
| C | 0.46 | 0.12 |
| D [1] | 0.67 | 0.08 |

[1] Operating conditions: 975° F., 100 p.s.i.g., 1 s.c.f./lb./hr., 2 hours.

EXAMPLE 6

The following demonstrates the effect of reaction temperature in desulfation of such catalysts with methane. Thus, the platinum-on-alumina containing 1.5 wt. percent sulfur, supra, was treated with methane at various reaction temperatures. As evident from the data given in Table II below, increasing the temperature from 800° F. to 1000° F., while keeping other conditions constant, reduced the sulfur on the catalyst from about 0.8 to 0.1 wt. percent.

TABLE II.—EFFECT OF TEMPERATURE IN THE DESULFATION OF REFORMER CATALYST WITH METHANE 100 p.s.i.g.; 3 s.c.f. methane/hour/pound catalyst; 4 hours 0.3 wt. percent Pt-on-$Al_2O_3$

| Temperature, ° F.: | Wt. percent sulfur |
|---|---|
| 800 | 0.80 |
| 850 | 0.61 |
| 900 | 0.45 |
| 950 | 0.29 |
| 1000 | 0.10 |

EXAMPLE 7

The following illustrative data demonstrate the effect of pressure on methane desulfation. Methane desulfation experiments were conducted at three pressures, i.e., 50, 100 and 300 p.s.i.g. and 1000° F. using a 0.3 wt. percent platinum-on-alumina catalyst. While the gas flow rate was constant at 6 cc./min., the total gas flow was varied from 8 to 13 s.c.f. of methane per pound of catalyst.

The data shown in Table III below indicate that lower pressure is beneficial.

TABLE III

| Pressure, p.s.i.g.: | Sulfur on treated catalyst, wt. percent |
|---|---|
| 300 | 0.18 |
| 100 | 0.12 |
| 50 | 0.04 |

EXAMPLE 8

The data of Table IV, below, shows the effect of varying the methane treat gas rate. The effect of the rate of addition of methane at 1000° F., 100 p.s.i.g. and a total methane flow of 12 s.c.f./pound of catalyst, on the desulfation of the catalyst of Example 7, is shown. The data indicate that low treat gas rates are desirable and suggest that the process of desulfation is diffusion limited.

TABLE IV.—EFFECT OF METHANE RATE IN DESULFATION OF REFORMER CATALYST

1000° F.; 100 p.s.i.g.; 0.3 wt. percent Pt-on-$Al_2O_3$ catalyst total gas flow~12 s.c.f./pound of catalyst

| Sulfur, wt. percent: | Methane rate s.c.f./lb./hr. |
|---|---|
| 0.14 | 1.5 |
| 0.10 | 2.0 |
| 0.13 | 3.0 |
| 0.26 | 6.0 |

EXAMPLE 9

The following demonstrates the effect of total treat gas volume.

The catalyst of Example 8 was methane treated at 1000° F., 100 p.s.i.g., and 3 s.c.f. of methane per pound of catalyst per hour in a series of runs to show the effect of total treat gas volume. The results are given in Table V, below. Increasing the length of the treat and thus the total gas volume produces a small reduction in sulfur. For example, increasing the total treat gas from 3 to 12 s.c.f. of methane per pound of catalyst reduces the sulfur on the catalyst from 0.18 to 0.12 weight percent.

TABLE V.—METHANE DESULFATION EFFECT OF TOTAL METHANE ON SULFUR 0.3 wt. percent Pt-on-$Al_2O_3$ catalyst; 1000° F.; 100 p.s.i.g. treat gas rate—3 s.c.f./pound/hour

| Wt. percent sulfur on treated catalyst: | Total methane s.c.f./pound |
|---|---|
| 0.17 | 3.0 |
| 0.14 | 6.0 |
| 0.12 | 9.0 |
| 0.12 | 12.0 |

EXAMPLE 10

The following example provides data comparing methane desulfation with conventional hydrogen treating.

Optimum operating conditions for conventional hydrogen desulfation of reformer catalyst were defined, and used for methane desulfation. The following Table VI sets forth data which compares optimum operating conditions to remove the sulfur from the catalyst defined in Example 1. Sulfur was reduced from 1.5 to 0.1 weight percent for both methane and hydrogen.

TABLE VI

| Treat gas | Methane | Hydrogen |
|---|---|---|
| Temperature, ° F | 1,000 | 900 |
| Pressure, p.s.i.g | 100 | 100 |
| Gas flow rate, s.c.f./lb./hr | 3 | 3 |
| Total gas volume, s.c.f./lb | 12 | 1.25 |

It is thus shown that to achieve the same sulfur removal from the catalyst with methane higher temperature, larger volumes of gas are required.

As previously suggested, and illustrated, while the use of methane effectively desulfates reformer catalyst, there is no evidence of the production of hydrogen sulfide. Obviously, the mechanism of methane desulfation is quite different from that of hydrogen desulfation. While applicants do not desire to be bound by a theory of mechanism, a tentative reaction mechanism has been postulated based primarily on qualitative observations of products.

Primary Reactions

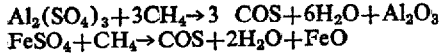

$Al_2(SO_4)_3 + 3CH_4 \rightarrow 3\ COS + 6H_2O + Al_2O_3$
$FeSO_4 + CH_4 \rightarrow COS + 2H_2O + FeO$ Secondary Reactions

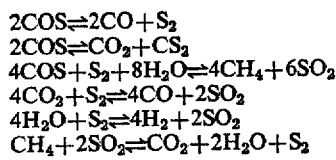

$2COS \rightleftharpoons 2CO + S_2$
$2COS \rightleftharpoons CO_2 + CS_2$
$4COS + S_2 + 8H_2O \rightleftharpoons 4CH_4 + 6SO_2$
$4CO_2 + S_2 \rightleftharpoons 4CO + 2SO_2$
$4H_2O + S_2 \rightleftharpoons 4H_2 + 2SO_2$
$CH_4 + 2SO_2 \rightleftharpoons CO_2 + 2H_2O + S_2$ Analysis of the tail gas of the various runs thus showed large amounts of sulfur dioxide and carbon dioxide. In addition, smaller amounts of carbonyl sulfide and carbon monoxide were found. Small amounts of free sulfur and water were also produced. The above thus postulates a number of reactions which can account for the products found in the tail gas. It is believed that the principle reaction is between the sulfate radical or sulfur trioxide and methane to give carbonyl sulfide. The carbonyl sulfide reacts according to the reversible reactions to produce the other compounds.

Moreover, since the total sulfate on the deactivated powerformer catalyst is greater than can be accounted for by combination with the platinum or iron contaminant on the catalyst, it was theorized that most of the sulfur is tied up with the alumina base. Runs were made to determine if the platinum or the alumina base were essential to initiate the desulfation reaction. Table VII shows the results of two runs in which aluminum sulfate and ferrous sulfate were impregnated on Ketjen CK–300 alumina and another experiment in which ferrous sulfate was put on 20–50 mesh (Tyler series) firebrick. In both cases, methane treatment of the impregnated material reduced the sulfur level by 85 to 90 percent. The reaction was found to be independent of either the support or the platinum component of the reforming catalyst.

TABLE VII.—DEMONSTRATES THAT NEITHER METAL DEHYDROGENATION COMPONENT NOR BASE REQUIRED IN METHANE DESULFATION

Operating Conditions: 1,000° F., 100 p.s.i.g., 3 s.c.f./lb./hr., 4 hours

| Base | Sulfate added | Sulfur, wt. percent Before | After |
|---|---|---|---|
| CK-300 alumina | Aluminum | 1.30 | 0.13 |
| Do | Iron (II) | 1.62 | 0.20 / 0.00 |
| Firebrick | do | 1.70 | 0.20 |

Several other gases have been tried for desulfating sulfur-poisoned catalysts. The results are shown in Table VIII, below. In all cases, the catalysts were treated with 3 s.c.f. of gas per pound of catalyst per hour at 1000° F. and 100 p.s.i.g. for 4 hours. The data indicate there has been some removal of sulfur from the catalyst by all gases but not is as effective as methane to reduce the sulfur to a low level. Some of the sulfur is apparently tied up as the trioxide in a loose association with the alumina base which can be mechanically stripped from the catalyst.

TABLE VIII.—DESULFATION OF REFORMING CATALYST WITH VARIOUS GASES

Catalyst: 0.3 wt. percent Pt-on-$Al_2O_3$ 1.51% S. Operating conditions: 1,000° F., 100 p.s.i.g., 3 s.c.f./lb./hr., 4 hours

| Treat gas | Sulfur, wt. percent | Percent sulfur reduction |
|---|---|---|
| Methane | 0.12 | 92 |
| Nitrogen | 0.38 | 75 |
| Air | 1.19 | 20 |
| Oxygen | 0.68 | 55 |
| Helium | 0.90 | 41 |
| No gas flow | 1.07 | 29 |

In Examples 11–14 it is demonstrated that the original activity of the catalyst can be restored without significant loss of activity when desulfating catalysts with methane. It is shown that the methane desulfated catalysts are as active as catalysts which have been desulfated using the conventional hydrogen treat; and methane treated, regenerated catalysts are, in fact, even more active than hydrogen regenerated catalysts. In Example 15, it is shown that a number of metallic sulfates distended on inorganic oxide bases can be desulfated, and hence sulfur poisoned catalysts of such character can be reactivated, or regenerated, pursuant to the practice of this invention.

EXAMPLES 11–12

To demonstrate regeneration of the catalysts, a series of runs were made wherein the 0.3 platinum-on-alumina catalyst of Example 10, which had been inactivated, sulfated and poisoned so that it contained 1.5 percent sulfur, was treated by the sequential steps of methane desulfation, oxidation, chlorination, rejuvenation and reduction-drying. The activity of the regenerated catalysts was then tested by reforming a 160/245° F. light naphtha, the inspections on which are described in Table IX, which follows:

TABLE IX.—ANALYSES OF LIGHT NAPHTHA FEED

Gravity, ° API=63.9

| ASTM distillation, ° F. | | G.C. component, wt. percent | |
|---|---|---|---|
| Init., percent | 163 | i-C$_5$ | 0.2 |
| 5% | 173 | n-C$_5$ | 1.0 |
| 10% | 175 | CyC$_5$ | 0.6 |
| 20% | 177 | i-C$_6$ | 11.2 |
| 30% | 181 | n-C$_6$ | 12.5 |
| 40% | 185 | MCP | 8.2 |
| 50% | 189 | CH | 6.4 |
| 60% | 195 | Bz | 2.7 |
| 70% | 201 | i-C$_7$ | 12.0 |
| 80% | 208 | n-C$_7$ | 8.9 |
| 90% | 220 | DMCP | 8.4 |
| 95% | 229 | MCH | 9.8 |
| FBP | 243 | Tol | 4.6 |
| RON-Cl | 64.1 | i-C$_8$ | 4.3 |
| Sulfur, p.p.m | 2 | n-C$_8$ | 1.7 |
| M.S. analysis, LV percent: | | | |
| Benzene | 2.7 | 8N$_8$ | 4.7 |
| Toluene | 5.2 | 8N$_9$ | 2.2 |
| C$_9$ aromatics | 0.3 | A$_9$ | 0.3 |
| Naphthenes | 38.7 | C$_9$+ | 0.3 |
| Paraffins | 51.4 | | |
| Cond. naph | 1.7 | | |

The series of comparative runs was made employing full air treats with consequent large amounts of oxygen, and a gas utilizing only a small amount of oxygen (Examples 11 and 12). The reforming runs were conducted at the specified conditions to produce 93 RON reformate. The results are given in Table X below.

TABLE X.—CATALYST REGENERATION

Catalyst: 0.3 wt. percent Pt-on-Al$_2$O$_3$; 1.51% S

| Example Number | | | 11 | 12 |
|---|---|---|---|---|
| Desulfation: | | | | |
| Gas | (¹) | (¹) | (¹) | (¹) |
| Rate, s.c.f./lb./hr | 1.8 | 3.1 | 3.1 | 3.0 |
| Temp., ° F | 975 | 975 | 950 | 975 |
| Press., p.s.i.g | 100 | 100 | 100 | 100 |
| Time, hrs | 4 | 4 | 4 | 4 |
| N$_2$ purge time, hrs | ½ | ½ | ½ | ½ |
| Oxidation: | | | | |
| Gas | Full air | | 1% O$_2$, 99% N$_2$ | |
| Rate, s.c.f./lb./hr | 38 | 38 | 3.1 | 3.0 |
| Temp., ° F | 975 | 975 | 975 | 975 |
| Press., p.s.i.g | 100 | 100 | 100 | 100 |
| Time, hrs | 4 | 4 | 24 | 24 |
| Chlorination (1% Cl, 5% O$_2$, 94% N$_2$): | | | | |
| Rate s.c.f./lb./hr | 21 | 38 | | 38 |
| Temp., ° F | 965 | 960 | 975 | 950 |
| Press., p.s.i.g | 100 | 100 | 100 | 100 |
| Time, hrs | 1 | 1 | 1 | 1 |
| Rejuvenation (full air): | | | | |
| Rate, s.c.f./lb./hr | 37 | 38 | | 38 |
| Temp., ° F | 975 | 975 | 975 | 975 |
| Press., p.s.i.g | 100 | 100 | 160 | 100 |
| Time, hrs | 4 | 4 | 4 | 4 |
| N$_2$ purge time, hrs | ½ | ½ | ½ | ½ |
| Reduction-Drying: | | | | |
| Gas | None | (²) | H$_2$/N$_2$, 30/70. | (²) |
| Rate, s.c.f./lb./hr | | | 45 | |
| Temp., ° F | | | 925 | |
| Press., p.s.i.g | | | 250 | |
| Time, hrs | | | 1 | |
| On Oil: | | | | |
| Temp., ° F | | | 800 | 850 |
| Press., p.s.i.g | | | 250 | 250 |
| Recycle gas rate, M s.c.f./B | | | 9 | 9 |
| Feed | Light naphtha feed described in Table IX | | | |
| Comments | Catalyst not active | | Good run | |

¹ Methane.
² Methane filled unit to 250 p.s.i.g.

The major difference between the runs which produced active or inactive catalysts, it will be observed, is in the oxidation step. When full air treats were used, peak temperatures of 1200° F. were reached in the catalyst bed as a result of burning carbon laid down on the catalyst during the methane desulfation step. These high temperatures have a detrimental effect on catalyst activity. With a mild 24-hour burn with one percent oxygen in nitrogen (Examples 11 and 12), peak temperature did not exceed 985° F.

In the final reduction-drying step, no difference was found between using a 30 percent hydrogen in nitrogen mixture or methane.

EXAMPLE 13

The methane desulfated catalysts of Examples 11 or 12 were compared with catalysts which were desulfated to contain 0.1 wt. percent sulfur with hydrogen, in addition reforming runs. The 160–245° F. virgin naphtha described in Table IX was subjected to the reforming conditions, indicated in Table XI, below. It is evident, in view of these data, that methane desulfation followed by the proper cataysr pretreatment can produce a catalyst which is more active than the hydrogen desulfated catalyst.

TABLE XI.—REFORMING WITH DESULFATED CATALYSTS

160–265° F. Virgin Naphtha; 1.5 W/W/hr.; 250 p.s.i.g.; 9 M s.c.f./B.; 93 RON

| EIT° F.¹ for 93 RON | | |
|---|---|---|
| Methane-desulfated catalyst | Hydrogen-desulfated catalyst | Hours on oil |
| 894 | 903 | 50 |
| 902 | 917 | 100 |
| 908 | 929 | 150 |
| 914 | 936 | 200 |
| 920 | 937 | 250 |

¹ EIT° F. is defined as average catalyst temperature.

The relative activity of the methane-desulfated catalyst, at each of the time intervals, was higher than that of the hydrogen-desulfated catalyst, and the spread increased as the time-on-oil increased such that at the end of the 250 hour period the activity of the methane-desulfated catalyst was almost twice that of the hydrogen-desulfated catalyst.

EXAMPLE 14

To further demonstrate the invention, and to show that methane-desulfation and regeneration can be employed with various other sulfated catalysts and various metallic sulfates, described below, supported on CK-300 alumina were treated with methane. The following data show that aluminum and iron sulfate are most easily desulfated.

| Compound: | Percent desulfation |
|---|---|
| Poisoned Pt-on-Al$_2$O$_3$ Cat. | 92 |
| Al$_2$(SO$_4$)$_3$ | 90 |
| FeSO$_4$ | 88 |
| ZnSO$_4$ | 81 |
| NiSO$_4$ | 33 |
| CuSO$_4$ | 30 |

It is apparent that various modifications, substitutions and additions can be made without departing the spirit and scope of the invention.

Having described the invention, what is claimed is:

1. In a regeneration process wherein a reforming catalyst consisting essentially of platinum supported on alumina has been coked, dehalogenated, sulfated, and thereby poisoned and deactivated, the improvement comprising (1) contacting the catalyst with methane at a temperature ranging from about 700° F. to about 1050° F. and at a pressure ranging from about 15 p.s.i.g. to about 300 p.s.i.g. to desulfate said catalyst, (2) contacting the said catalyst with a gas containing small amounts of oxygen in concentrations sufficient to oxidize the coke from the catalyst at temperatures ranging from about 800° F. to about 1050° F., (3) contacting the coke depleted catalyst with a halogen-containing gas at temperatures ranging from about 600° F. to about 1050° F. and continuing the halogen treatment for a time sufficient to build up the halogen content of the catalyst, (4) contacting the said catalyst with an oxygen-containing gas at temperatures ranging from about 500° F. to about 1000° F. to rejuvenate the catalyst, and then (5) contacting and drying the catalyst with hydrogen or a nonreactive gas at temperatures ranging from about 800° F. to about 1000° F.

2. The process of claim 1 wherein Steps 1 to 5 are preceded by the added steps of
   (1) purging the catalyst with a flue gas to eliminate hydrocarbon therefrom, and then
   (2) contacting the catalyst with oxygen to oxidize coke deposits therefrom, as described in Step 2 of claim 1.

3. The process of claim 1 wherein the catalyst is contacted with methane, in Step (1), at temperatures ranging from about 875 to about 1000° F.

4. The process of claim 3 wherein the catalyst is contacted with methane at pressures ranging from about 50 p.s.i.g. to about 150 p.s.i.g.

5. The process of claim 1 wherein the said catalyst is contacted with an oxygen-containing gas, in Step (2), at temperatures ranging from about 900 to about 980° F.

6. The process of claim 1 wherein the coke-depleted catalyst is contacted with a halogen-containing gas, in Step (3), at temperatures ranging from about 850 to about 1000° F.

7. The process of claim 6 wherein the contact is continued for a period of time ranging from about 0.5 to about 24 hours, and from about 0.8 to 1.0 wt. percent halogen is added to the catalyst.

8. The process of claim 1 wherein the said catalyst is contacted with an oxygen-containing gas, in Step (4), at temperatures ranging from about 850 to about 950° F.

9. The process of claim 1 wherein the catalyst is contacted with hydrogen or a nonreactive gas, in Step (5), at temperatures ranging from about 850 to about 950° F.

10. The process of claim 2 wherein the catalyst is purged with a flue gas, in Step (1), at about 900° F. to minimize hydrocarbon absorption of the catalyst.

11. The process of claim 2 wherein the catalyst is contacted with oxygen, in Step (2), at temperatures ranging from about 900° F. to about 980° F.

12. The process of claim 1 wherein Steps 1 to 5 are preceded by the added steps of
   (1) purging the catalyst with a flue gas to eliminate hydrocarbons therefrom at a temperature of about 900° F. to minimize hydrocarbon adsorption by the catalyst, and then
   (2) contacting the catalyst with oxygen to oxidize and burn carbon or coke deposits therefrom, as described in Step 2 of claim 1, the oxygen content of the gas being gradually increased to the time of oxygen break-through, after which time the burn is discontinued.

References Cited
UNITED STATES PATENTS

| | | | |
|---|---|---|---|
| 3,134,732 | 5/1964 | Kearby et al. | 208—140 |
| 2,853,435 | 9/1958 | Evering et al. | 208—140 |
| 3,501,897 | 3/1970 | Van Helden et al. | 55—73 |
| 3,428,575 | 2/1969 | Pijpers et al. | 252—464 |
| 3,411,865 | 11/1968 | Pijpers et al. | 23—2 S |
| 2,992,884 | 7/1961 | Bienstock et al. | 23—2 S |

FOREIGN PATENTS

| | | | |
|---|---|---|---|
| 744,459 | 2/1956 | Great Britain | 252—411 |

DANIEL E. WYMAN, Primary Examiner

P. E. KONOPKA, Assistant Examiner

U.S. Cl. X.R.

208—140; 252—411 S, 416, 419